United States Patent
Garza Fernandez et al.

(10) Patent No.: US 12,468,021 B2
(45) Date of Patent: Nov. 11, 2025

(54) METHOD FOR DETECTING A DEFOCUSING OF A LIDAR SENSOR, AND LIDAR SENSOR

(71) Applicant: Robert Bosch GmbH, Stuttgart (DE)

(72) Inventors: Juan Carlos Garza Fernandez, Stuttgart (DE); Patrick Volz, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 178 days.

(21) Appl. No.: 18/539,776

(22) Filed: Dec. 14, 2023

(65) Prior Publication Data
US 2024/0201347 A1 Jun. 20, 2024

(30) Foreign Application Priority Data
Dec. 20, 2022 (DE) .................... 10 2022 214 040.0

(51) Int. Cl.
*G01S 7/497* (2006.01)
*B60S 1/56* (2006.01)
*G01S 7/481* (2006.01)
*G01S 17/931* (2020.01)

(52) U.S. Cl.
CPC ............ *G01S 7/497* (2013.01); *G01S 7/4814* (2013.01); *G01S 7/4816* (2013.01); *G01S 17/931* (2020.01); *B60S 1/56* (2013.01); *G01S 2007/4977* (2013.01)

(58) Field of Classification Search
CPC ...... G01S 7/497; G01S 7/4814; G01S 7/4816; G01S 717/931; G01S 2007/4977; G01S 17/42; G01S 2007/4975; G01S 7/4817; B60S 1/56
See application file for complete search history.

(56) References Cited

U.S. PATENT DOCUMENTS

| | | | |
|---|---|---|---|
| 11,550,044 B2* | 1/2023 | Kudla | G01S 7/4817 |
| 12,235,396 B1* | 2/2025 | Terefe | B60S 1/54 |
| 2023/0243942 A1* | 8/2023 | Mielke | G01S 7/4817 |
| | | | 356/4.01 |
| 2025/0085402 A1* | 3/2025 | Watson | G01S 17/86 |
| 2025/0236289 A1* | 7/2025 | Gunbatar | B60W 30/0956 |

FOREIGN PATENT DOCUMENTS

| | | |
|---|---|---|
| DE | 112008003342 T5 | 1/2011 |
| DE | 102018217467 A1 | 4/2020 |
| DE | 102020209849 A1 | 2/2022 |

* cited by examiner

Primary Examiner — Thomas Ingram
(74) Attorney, Agent, or Firm — NORTON ROSE FULBRIGHT US LLP (57) ABSTRACT

A method for detecting a defocusing of a LIDAR sensor. The method includes: emitting primary light as a laser line into a field of view of the LIDAR sensor using a laser emitter unit of a transmitting unit of the LIDAR sensor for scanning the field of view; receiving, using a matrix-shaped detector unit of a receiving unit, secondary light reflected and/or scattered by an object in the field of view, wherein the detector unit has a first reception area and a second reception area different from the first reception area; determining, using evaluation unit, a distance between the LIDAR sensor and an object in the field of view of the LIDAR sensor based on secondary light received in the first reception area, and ascertaining, by means of an evaluation unit, information about an extent of the defocusing based on the secondary light received in the second reception area.

9 Claims, 5 Drawing Sheets

METHOD FOR DETECTING A DEFOCUSING OF A LIDAR SENSOR, AND LIDAR SENSOR

CROSS REFERENCE

The present application claims the benefit under 35 U.S.C. § 119 of German Patent Application No. DE 10 2022 214 040.0 filed on Dec. 20, 2022, which is expressly incorporated herein by reference in its entirety.

FIELD

The present invention relates to a method for detecting a defocusing of a LIDAR sensor and to a LIDAR sensor.

BACKGROUND INFORMATION

For protection against external environmental influences, LIDAR (Light Detection and Ranging) sensors, in particular for use for driver assistance functions in the automotive sector, are often arranged in a housing with a transparent protective glass. The information transfer (e.g., the propagation of electromagnetic radiation/of light) associated with the LIDAR sensor takes place through the protective glass. If this protective glass is contaminated by contaminations, such as water or small particles, the information flow is disrupted and the LIDAR sensor is restricted in its function. Certain weather phenomena such as fog, rain or snow can also interfere with the information flow. In order to eliminate such a function restriction, cleaning devices may, for example, be attached to the outer side of the protective glass.

German Patent Application No. DE 10 2020 209 849 A1 describes a method for ascertaining an optical crosstalk of a lidar sensor, in particular of a spatially resolving lidar sensor, and such a lidar sensor.

German Patent Application No. DE 2018 217 467 A1 describes an optical system, in particular LIDAR system, comprising a contamination detection system.

SUMMARY

The present invention relates to methods for detecting a defocusing of a LIDAR sensor. According to an example embodiment of the present invention, the method includes the following steps: emitting primary light in the form of a laser line into a field of view of the LIDAR sensor by means of at least one laser emitter unit of a transmitting unit of the LIDAR sensor for scanning the field of view; receiving, by means of a matrix-shaped detector unit of a receiving unit, secondary light reflected and/or scattered by an object in the field of view; wherein the detector unit has a first reception area and a second reception area different from the first reception area; determining, by means of an evaluation unit, a distance between the LIDAR sensor and an object in the field of view of the LIDAR sensor on the basis of secondary light received in the first reception area, and ascertaining, by means of an evaluation unit, information about an extent of the defocusing on the basis of secondary light received in the second reception area.

According to an example embodiment of the present invention, the first reception area is determined by means of a calibration of the matrix-shaped detector unit. The first reception area and the second reception area are separately activated for receiving secondary light. And the second reception area is activated during individual scan recordings of several temporally consecutive scan recordings.

By means of a LIDAR sensor, a distance between the LIDAR sensor and an object in a field of view of the LIDAR sensor can be determined, for example, on the basis of a time of flight (TOF) or on the basis of a frequency-modulated continuous wave (FMCW) signal. For this purpose, the LIDAR sensor in particular comprises an evaluation unit, which is designed to determine a light time of flight of the transmitted primary light and of the re-received secondary light. This is in particular the same evaluation unit that ascertains the information about an extent of the defocusing of the LIDAR sensor. The light time-of-flight methods include pulse methods, which determine the reception time of a reflected laser pulse, or phase methods, which transmit an amplitude-modulated light signal and determine the phase offset to the received light signal.

Furthermore, the LIDAR sensor according to the present invention in particular comprises a deflection unit, by means of which primary light can be emitted into the field of view at different deflection angles. This makes it possible to scan the field of view. An image of the environment can be derived from the correspondingly angle-dependent individual measurements. For example, the deflection unit can be designed as a rotating platform on which the transmitting unit and the receiving unit (or respectively parts thereof) are arranged. The LIDAR sensor can thus be designed as a rotating system, for example.

The LIDAR sensor can, for example, be designed for a vehicle or for a work device.

A defocusing of the LIDAR sensor can be caused, for example, by a contamination on a protective glass of the LIDAR sensor. Alternatively, or simultaneously, weather phenomena such as fog, rain or snow can also cause a defocusing of the LIDAR sensor. In the case of a defocusing, in particular, a point spread function of the signals of the secondary light received on the detector unit becomes wider in comparison to a focused state of the LIDAR sensor.

According to an example embodiment of the present invention, the laser emitter unit can be designed to emit the primary light in the form of a laser line. Alternatively, the laser emitter unit can emit primary light in the form of a point-shaped laser beam and the transmitting unit can comprise optical units, for example optical lenses, that shape the point-shaped laser beam to form a laser line. The receiving unit can furthermore comprise optical units, such as optical lenses, mirrors, etc.

The receiving unit can furthermore comprise optical units, such as optical lenses, mirrors, etc. The latter can be designed to image the secondary light onto the detector unit as losslessly as possible.

According to an example embodiment of the present invention, the first reception area is in particular known prior to a distance measurement by means of the LIDAR sensor. The calibration in particular takes place prior to determining the distance between the LIDAR sensor and an object in the field of view and also prior to ascertaining information about an extent of the defocusing of the LIDAR sensor. For example, the calibration can take place prior to putting the LIDAR sensor into operation. This can ensure that, for example, a protective glass of the LIDAR sensor is uncontaminated. In the step of calibration, exactly one pixel in which an intensity maximum of the received secondary light occurs is in particular determined in each row of the matrix-shaped detector unit. The first reception area is then formed from these pixels. The pixels ascertained by means of the calibration can also be referred to as activated pixels. In other words, the first reception area is in particular formed from the pixels for which it was ascertained in the step of calibration that an intensity maximum of the received secondary light occurs in respectively this pixel of a row of the matrix-shaped detector unit. The first reception area in particular comprises so-called activated pixels. In this respect, the term "activated" means that these pixels are used for a distance measurement by means of the LIDAR sensor.

According to an example embodiment of the present invention, the second reception area in particular comprises so-called inactivated pixels. In this respect, the term "inactivated" means that these pixels are not used for a distance measurement by means of the LIDAR sensor.

The fact that the second reception area is activated during individual scan recordings of several temporally consecutive scan recordings can be understood to mean that, in the method presented here according to the present invention, in particular during a majority of the scan recordings, pixels of the first reception area are activated. Only with a certain number of scan recordings are pixels of the second reception area activated. In other words, by means of a LIDAR sensor, a distance between the LIDAR sensor and an object in the field of view is determined most of the time by means of several scan recordings. However, every few scan recordings, the second reception area rather than the first reception area is activated. Purely by way of example, this can be the case every ten scan recordings. However, the interval between the scan recordings for which the second reception area is activated can also be smaller or larger. In particular, the second reception area is activated at a regular interval of scan recordings. For example, the interval can be dependent on a driving situation of a vehicle in which the LIDAR sensor is installed. For example, at a high speed of the vehicle, a greater interval may be useful in order to ensure the availability of the LIDAR sensor. At a lower speed, the second reception area can also be activated more frequently. For example, the interval can also be adjusted if, for example, a point cloud recorded by means of the LIDAR sensor outputs only points <100 m, since this could indicate contamination.

An advantage of the present invention is that no additional system for detecting the defocusing is necessary. Rather, the matrix-shaped detector unit belonging to the LIDAR sensor can be used. Advantageously, two directly successive scan recordings of secondary light which were recorded by means the detector unit and for which once the first reception area and once the second reception area were activated can be compared to one another. If the first reception area and the second reception area are, for example, oblique on the detector unit, a defocusing can in particular already be detected within one scan recording when adjacent rows are compared to one another.

In an advantageous embodiment of the present invention, it is provided that the first reception area is formed from a first sequence of pixels along several rows of the matrix-shaped detector unit, wherein the first sequence comprises exactly one pixel in each row; and that the second reception area is formed from a second sequence of pixels along the several rows of the matrix-shaped detector unit, wherein the second sequence comprises exactly one pixel in each row, and wherein the pixels of the second sequence in each row are shifted by the same number of pixels and in the same direction relative to a respectively adjacent pixel of the first sequence in the row.

For example, the pixels of the second sequence can respectively be shifted, starting from the first sequence, by one column, two, three, four or more columns on the detector unit. The pixels of the second sequence are in particular adjacent to the pixels of the first sequence. A defocusing can advantageously be ascertained thereby. If a defocusing is present, this results in a wider point spread function. In the second reception area, higher intensities of the signals can be detected.

In a further, advantageous embodiment of the present invention, it is provided that the first sequence is furthermore designed in such a way that a pixel of a row is located in the same column as a pixel of a directly adjacent row of the matrix-shaped detector unit and/or that a pixel of a row is located in a directly adjacent column as a pixel of a directly adjacent row of the matrix-shaped detector unit.

The first sequence is in particular formed from pixels that are located in several directly adjacent rows of a column. The first sequence can accordingly be designed as a straight line.

Alternatively, according to an example embodiment of the present invention, the first sequence is in particular designed in such a way that a first portion of the pixels is located in several directly adjacent rows of a first column and an at least second portion of the pixels is located in several directly adjacent rows of a second or further column, which is directly adjacent to the first column or the column of the previous portion of the pixels. The first sequence can accordingly be designed as a stepped series. In this case, pixels that are located both in the same column with a portion of the pixels of the first sequence and in a directly adjacent column with a portion of the pixels are in particular arranged at the stepped transitions.

An advantage of this embodiment of the present invention is that the extension and the position of the first reception area are particularly accurately adapted to the calibration. Although secondary light received as a line is not exactly imaged onto a column of the matrix-shaped detector unit, the first reception area can be formed as a stepped series. This makes it possible to define the first (and thus also the second) reception area very precisely, regardless of whether the secondary light is exactly imaged onto a column or somewhat obliquely impinges on the matrix-shaped detector unit.

In a further, advantageous embodiment of the present invention, it is provided that the method comprises the further step of transmitting the ascertained information about an extent of the defocusing to a control unit of a vehicle, which is designed to control a driving function of the vehicle.

An advantage of this embodiment of the present invention is that the safety of a driving operation can be ensured when the LIDAR sensor is used in a vehicle. For example, if the control unit of the vehicle receives the information that the extent of a defocusing of a particular LIDAR is so large that a distance measurement by means of the LIDAR can no longer be trusted, the control unit can control further steps within the vehicle. For example, it can control the use of further LIDAR sensors installed in the vehicle, for distance measurement. Or, it can bring about that alternative sensors are used to ascertain information necessary for particular driving functions. It can also control means of the vehicle for changing a speed of the vehicle. Influencing further driving functions by means of the control unit is possible.

In a further, advantageous embodiment of the present invention, it is provided that the method comprises the further step of controlling a cleaning device of the LIDAR sensor if the extent of the defocusing exceeds a predetermined threshold value.

An advantage of this embodiment of the present invention is that, if the detected defocusings are contaminations, they can be eliminated. This can advantageously take place directly after a contamination on the protective glass has been detected. It is particularly advantageous in this case if the cleaning device cleans the protective glass during ongoing operation of the LIDAR sensor or the operation of the LIDAR sensor only has to be interrupted briefly. As a result, in at least partially autonomously driving vehicles in particular, failures of a LIDAR sensor can be avoided or at least significantly shortened.

The present invention furthermore proceeds from a computer program configured to perform the described method(s) of the present invention.

The method furthermore proceeds from a machine-readable storage medium on which the described computer program is stored.

The present invention furthermore proceeds from a LIDAR sensor comprising a transmitting unit with at least one laser emitter unit, which is designed to emit primary light in the form of a laser line into a field of view of the LIDAR sensor; a receiving unit with a matrix-shaped detector unit, which is designed to receive secondary light reflected and/or scattered by an object in the field of view; wherein the detector unit has a first reception area and a second reception area different from the first reception area, and an evaluation unit, which is designed to determine a distance between the LIDAR sensor and an object in the field of view of the LIDAR sensor on the basis of secondary light received in the first reception area and to ascertain information about an extent of a defocusing of the LIDAR sensor on the basis of the secondary light received in the second reception area.

According to the present invention, the first reception area can be determined by means of a calibration of the matrix-shaped detector unit; and the first reception area and the second reception area can separately be activated for receiving secondary light; and the second reception area can be activated during individual scan recordings of several temporally consecutive scan recordings.

In an advantageous embodiment of the present invention, it is provided that the first reception area is formed from a first sequence of pixels along several rows of the matrix-shaped detector unit, wherein the first sequence comprises exactly one pixel in each row; and that the second reception area is formed from a second sequence of pixels along the several rows of the matrix-shaped detector unit, wherein the second sequence comprises exactly one pixel in each row, and wherein the pixels of the second sequence in each row are shifted by the same number of pixels and in the same direction relative to a respectively adjacent pixel of the first sequence in the row.

In a further, advantageous embodiment of the present invention, it is provided that the LIDAR sensor furthermore comprises a cleaning device for preventing, inhibiting and/or eliminating at least one contamination of the protective glass.

In a further, advantageous embodiment of the present invention, it is provided that the LIDAR sensor furthermore comprises a control unit designed to control the cleaning device as a function of a detected contamination.

It is understood that the aforementioned features and the features yet to be explained below can be used not only in the respectively specified combination but also in other combinations, or alone, without departing from the scope of the present invention.

BRIEF DESCRIPTION OF THE DRAWINGS

Exemplary embodiments of the present invention are explained in greater detail below with reference to the figures. Identical reference signs in the figures denote identical or identically acting elements.

DETAILED DESCRIPTION OF EXAMPLE EMBODIMENTS

Figure 1:
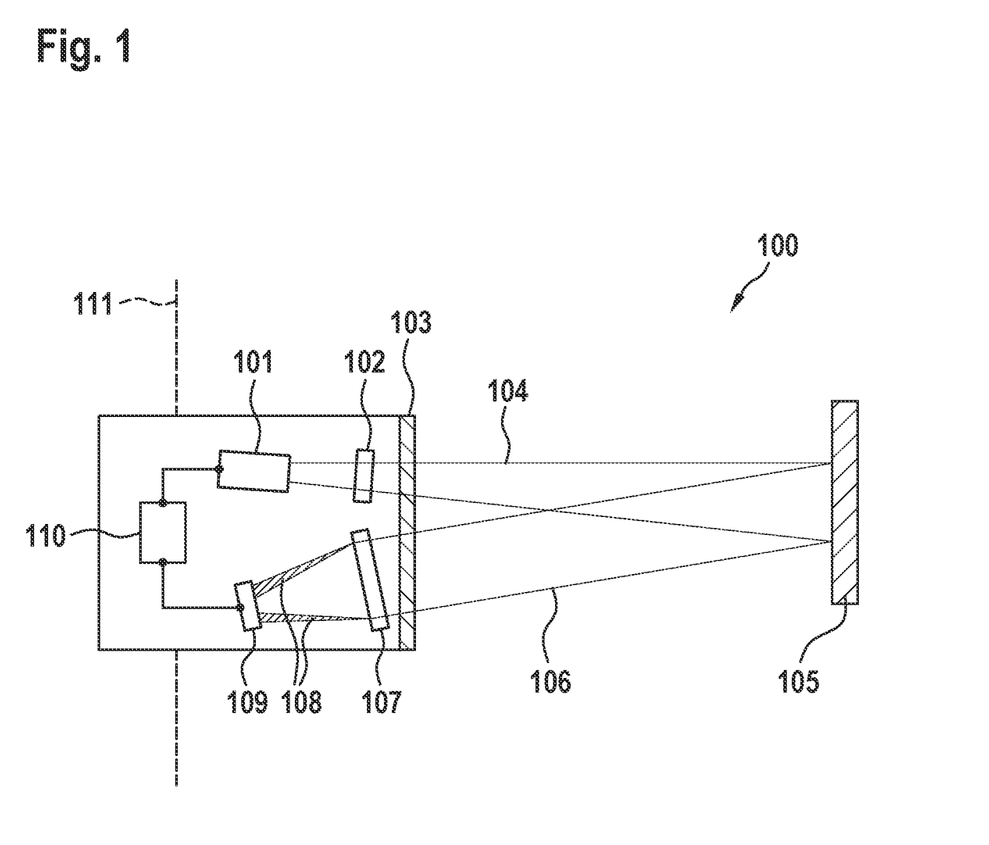
FIG. 1 shows a schematic overview of components of a LIDAR sensor according to an example embodiment of the present invention.

FIG. 1 shows, by way of example, a schematic overview of components of a LIDAR sensor 100 according to the present invention. The LIDAR sensor 100 comprises a transmitting unit with a laser emitter unit 101 configured, in connection with transmitting optics 102, to transmit primary light 104 in the form of a laser line through a protective glass 103 of the LIDAR sensor 100 into a field of view of the LIDAR sensor 100. Secondary light 106 reflected and/or scattered on an object 105 in the field of view of the lidar sensor 100 enters the LIDAR sensor 100 again through the protective glass 103 of the LIDAR sensor 100 and is imaged by receiving optics 107 of a receiving unit of the LIDAR sensor 100 onto a matrix-shaped detector unit 109 of the receiving unit. The detector unit 109 has a first reception area and a second reception area different from the first reception area. The first reception area can be determined by means of a calibration of the matrix-shaped detector unit. The first reception area and the second reception area can separately be activated for receiving secondary light. Furthermore, the second reception area can be activated during individual scan recordings of several temporally consecutive scan recordings. One way of designing the detector unit 109, including the first and second reception areas, is described in more detail in FIGS. 2, 3 and 5.

As a result of a scattering property of the protective glass 103, for example due to contaminations, the received secondary light can comprise scattered light components 108, which can lead to a reduction of an accuracy of a spatial resolution of the LIDAR sensor 100. An evaluation unit 110 according to the present invention, which can, for example, be designed as an ASIC, can be connected by information technology to the laser emitter unit 101 and the matrix-shaped detector unit 109. On the basis of a computer program that is executed by the evaluation unit 110 and implements above-described method steps according to the present invention, the evaluation unit 110 is configured to determine a distance between the LIDAR sensor 100 and an object 105 in the field of view of the LIDAR sensor 100 on the basis of secondary light received in the first reception area 203 and to ascertain information about an extent of the defocusing of the LIDAR sensor 100.

For example, the LIDAR sensor 100 can be designed as a system rotating about an axis of rotation 111.

Figure 2:
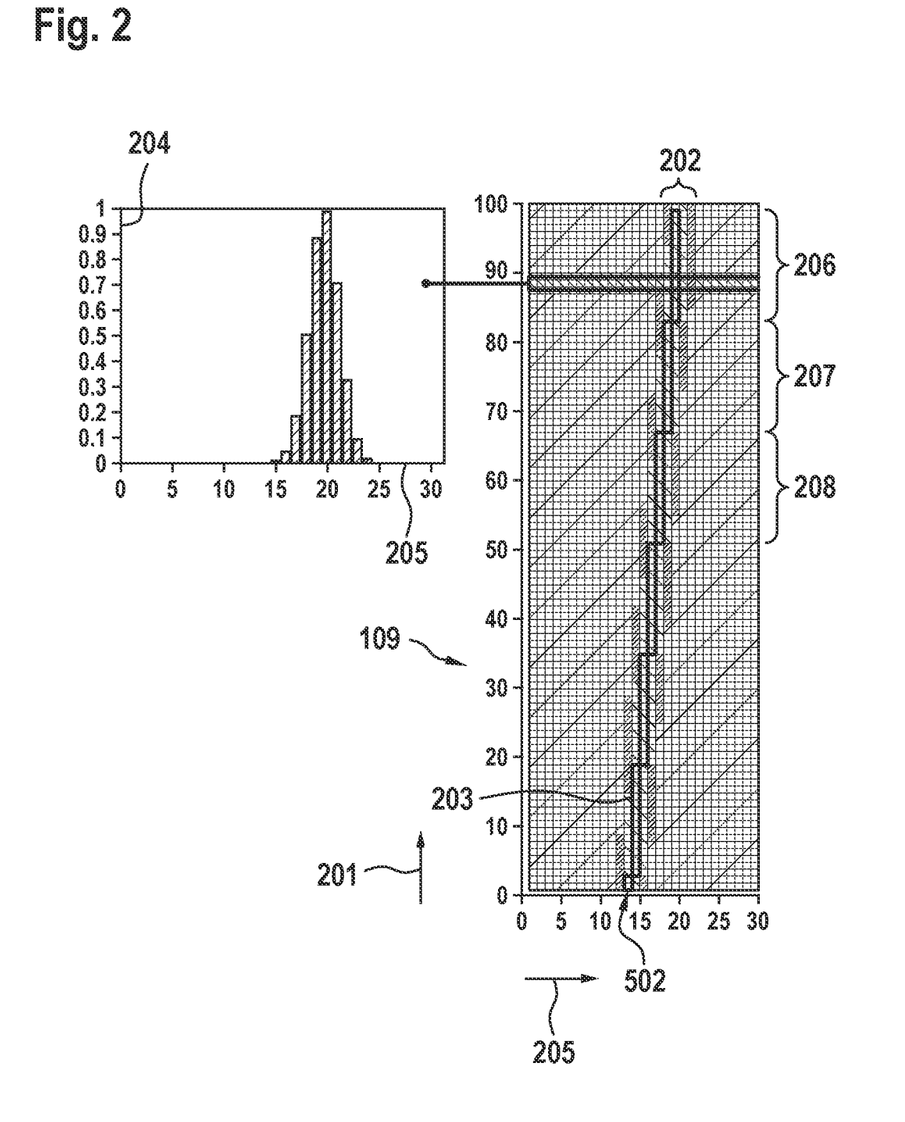
FIG. 2 shows an exemplary representation of secondary light received on the detector unit, without defocusing of the LIDAR sensor.

FIG. 2 shows, by way of example, a representation of secondary light received on the detector unit 109, without (or with only very minor) defocusing of a LIDAR sensor 100 as shown by way of example in FIG. 1. This is the case, for example, if the protective glass 103 has no contamination or only very low scattering contamination. Here, even weather phenomena such as fog, rain or snow do not currently occur in the field of view of the LIDAR sensor.

The detector unit 109 comprises pixels that are arranged in the example shown here as a matrix with 100 rows 201 and 30 columns 205. Pixels onto which secondary light is imaged are in this case shown brighter, according to a signal intensity in the respective pixel. The secondary light is here imaged in the form of a line slightly obliquely onto the detector unit 109. In this case, in each row 201, the secondary light is imaged onto pixels of approximately six columns. This is marked, by way of example, for the 84th to 100th row 201 by means of the bracket 202.

The first reception area 203 used for the method according to the present invention for determining a distance between the LIDAR sensor 100 and an object 105 in the field of view of the LIDAR sensor 100 is determined by means of a calibration of the matrix-shaped detector unit 109. Accordingly, in the example shown here, the first reception area 203 is formed from a first sequence 502 of pixels along several rows 201 of the matrix-shaped detector unit 109, wherein the first sequence 502 comprises exactly one pixel in each row 201. The pixels associated with the reception area 203 are surrounded by a thicker border.

It can be seen that the first sequence 502 in the example shown is designed in such a way that a pixel of a row 201 is located in the same column 205 as a pixel of a directly adjacent row 201 of the matrix-shaped detector unit 109 and/or that a pixel of a row 201 is located in a directly adjacent column 205 as a pixel of a directly adjacent row 201 of the matrix-shaped detector unit 109. The first sequence 502 is designed as a stepped series here. A first portion of the pixels of the sequence 502 is located in several directly adjacent rows 201 of a first column 205. Such a first portion is, by way of example, marked with the bracket 206. A second portion of the pixels is located in several directly adjacent rows 201 of a second column 205, which is directly adjacent to the first column of the first portion 206 of the pixels. Such a second portion is, by way of example, marked with the bracket 207. A further portion of the pixels is located in several directly adjacent rows 201 of a further column 205, which is directly adjacent to the second column of the second portion 207 of the pixels. Such a further portion is, by way of example, marked with the bracket 208. All portions together, including those not marked here, together form the series, which is stepped here.

For determining the first reception area 203 by means of a calibration, exactly one pixel in which an intensity maximum of the received secondary light occurs is in particular determined in each row 201 of the matrix-shaped detector unit 109. This is shown, by way of example, for the 89th row of the detector unit 109. The left part of FIG. 2 shows a corresponding diagram in which the signal intensity 204 is plotted over the columns 205. The intensity maximum for the 89th row 201 is in the pixel of the 19th column 205. Accordingly, the pixel from the 89th row 201 and the 19th column 205 is assigned here to the first reception area 203. This procedure is repeated for all rows 201 of the detector unit 109 and the thus ascertained pixels are assembled to form the first reception area 203. This can in particular take place in a step of calibration.

The measurement, shown here in FIG. 2, of received secondary light on the detector unit 109 can, for example, be used for a calibration of the detector unit for adjusting the first reception area 203.

Figure 3:
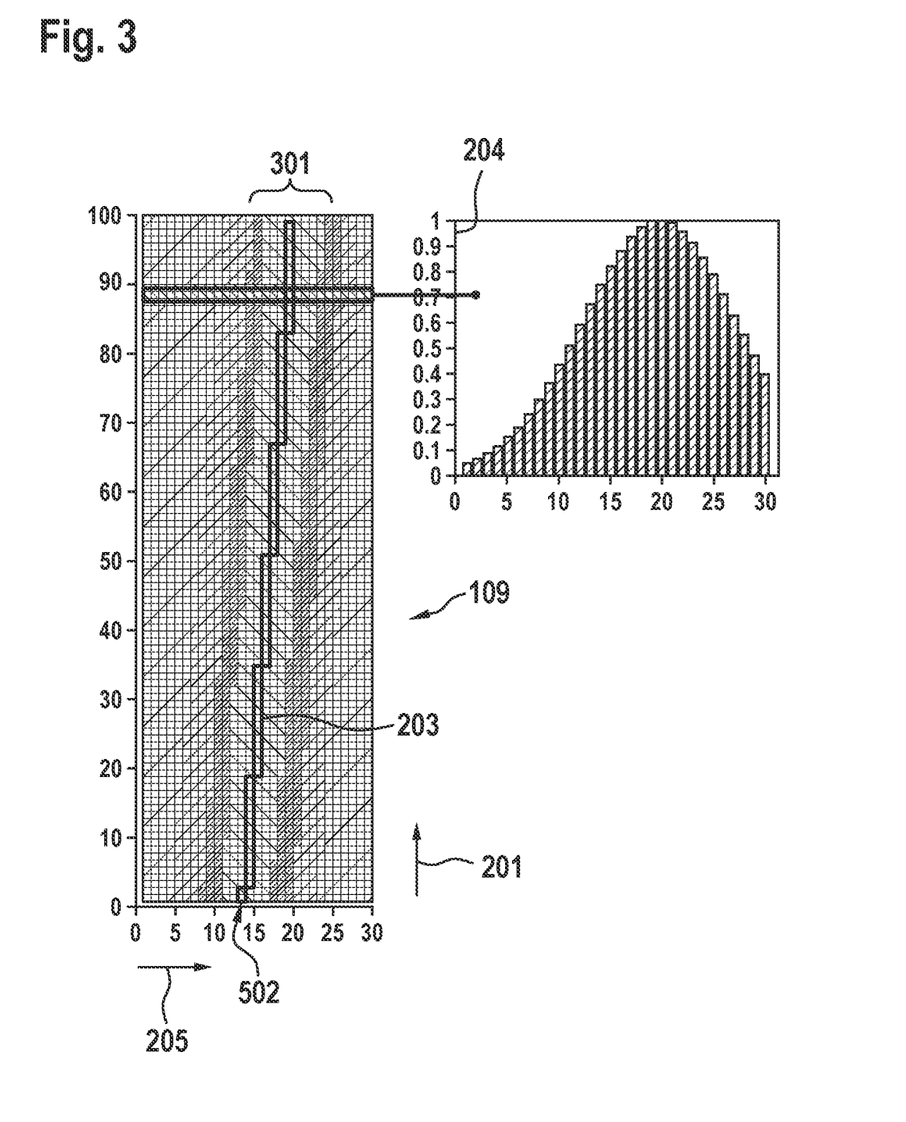
FIG. 3 shows an exemplary representation of secondary light received on the detector unit, with defocusing of the LIDAR sensor.

FIG. 3 shows, by way of example, a representation of secondary light received on the detector unit 109, with defocusing of a LIDAR sensor 100, for example from FIG. 1. FIG. 3 is similar to FIG. 2 in some points so that the differences are primarily discussed.

In FIG. 3, the pixels of the detector unit 109 onto which secondary light is imaged are again shown brighter, according to a signal intensity in the respective pixel. The secondary light is again imaged in the form of a line slightly obliquely onto the detector unit 109. However, this line is significantly wider due to the defocusing of the LIDAR sensor caused, for example, by a contamination on the protective glass and by scattering caused thereby. In each row 201, the secondary light is in this case imaged onto pixels of approximately 14 columns. This is marked, by way of example, for the 84th to 100th row 201 by means of the bracket 301. A widening of the signal intensity 204 can also be seen in the right diagram for the 89th row of the detector unit 109. The point spread function shown here is significantly widened in comparison to FIG. 2. Pixels not assigned to the first reception area 203 can be used to form a second reception area. This is explained in more detail in the description of the method 400 in FIG. 4 and for FIG. 5.

Figure 4:
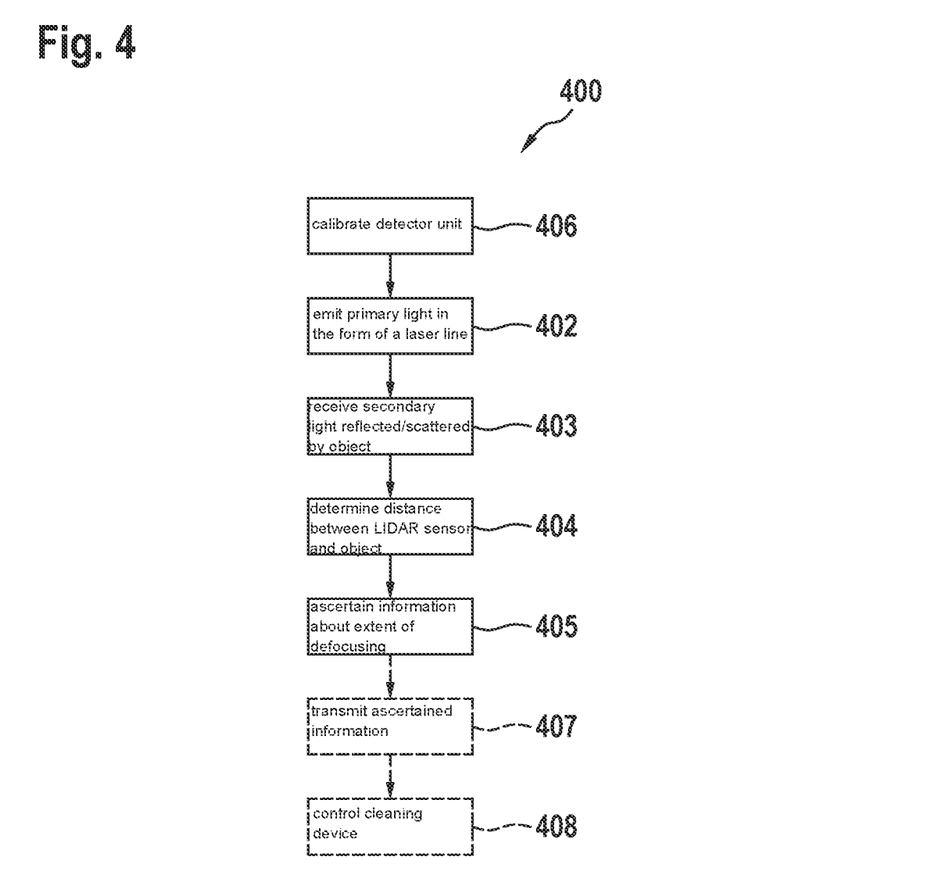
FIG. 4 shows an exemplary embodiment of a method for detecting a defocusing of a LIDAR sensor, according to the present invention.

FIG. 4 shows an exemplary embodiment of a method 400 for detecting a contamination on a protective glass 103 of a LIDAR sensor 100 as shown, for example, in FIG. 1.

In step 402, primary light 104 in the form of a laser line is emitted into a field of view of the LIDAR sensor 100 by means of at least one laser emitter unit 101 of a transmitting unit of the LIDAR sensor 100. In step 403, secondary light 106 reflected and/or scattered by an object 105 in the field of view is received by means of a matrix-shaped detector unit 109 of a receiving unit. Here, the detector unit 109 has a first 203 and a second 501 reception area as described in FIGS. 2 and 5. In step 404, a distance between the LIDAR sensor and an object in the field of view of the LIDAR sensor is determined by means of an evaluation unit on the basis of secondary light received in the first reception area. In step 405, information about an extent of a defocusing of the LIDAR sensor is ascertained by means of an evaluation unit on the basis of secondary light 106 received in the second reception area 501. The first reception area 203 and the second reception area 501 are, in this case, separately activated for receiving 403 secondary light. Here, the second reception area 501 is activated during individual scan recordings of several temporally consecutive scan recordings.

The actual method 400 is preceded, so to speak, by step 406 of the calibration of the detector unit 109, and wherein a result of the calibration is used to determine the first reception area 203.

The method 400 can optionally comprise the further step 407, in which ascertained information about an extent of the defocusing of the LIDAR sensor 100 is transmitted to a control unit of a vehicle, which is designed to control a driving function of the vehicle.

The method 400 can optionally comprise the further step 408, in which a cleaning device of the LIDAR sensor 100 is controlled if the extent of the defocusing exceeds a predetermined threshold value.

Figure 5:
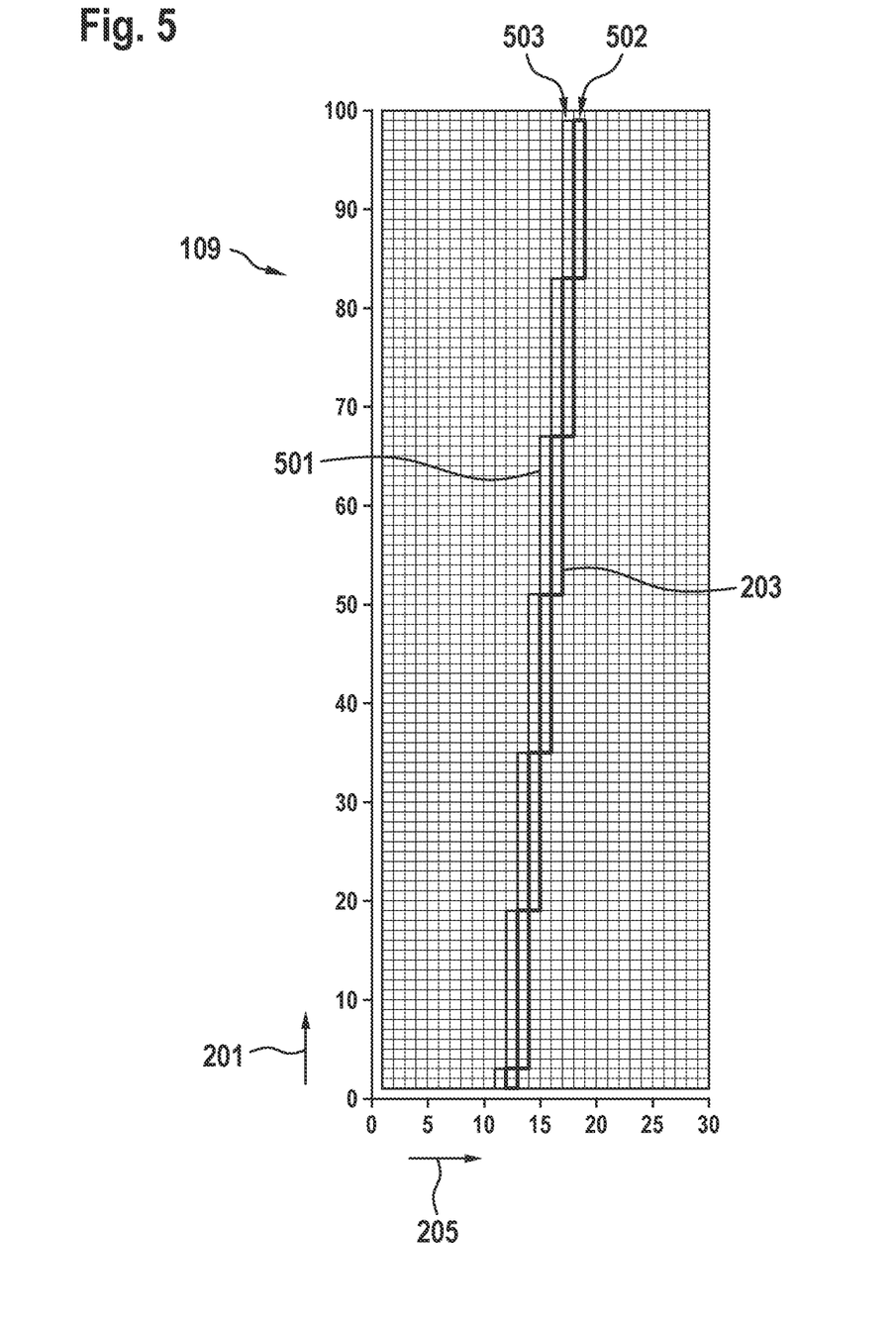
FIG. 5 shows an exemplary representation of the first and the second reception area of the detector unit.

FIG. 5 shows an exemplary representation of the first 203 reception area and the second reception area 501 of the detector unit 109. The first reception area 203 corresponds here to the first reception area 203 described in FIG. 2. The second reception area 501 of the detector unit 109 differs from the first reception area 203. The second reception area 501 is formed here from a second sequence 503 of pixels along the several rows 201 of the matrix-shaped detector unit 109, wherein the second sequence 503 comprises exactly one pixel in each row 201, and wherein the pixels of the second sequence 503 in each row 201 are shifted by the same number of pixels and in the same direction relative to a respectively adjacent pixel of the first sequence 502 in the row 201. The second sequence 503 of FIG. 5 is, for example, shifted to the left by exactly one pixel in comparison to the first sequence 502. The second sequence 503 of FIG. 5, just like the first sequence 502, is bordered by a thicker line.

What is claimed is:

1. A method for detecting a defocusing of a LIDAR sensor, comprising the following steps:
    emitting primary light in the form of a laser line into a field of view of the LIDAR sensor using at least one laser emitter unit of a transmitting unit of the LIDAR sensor for scanning the field of view;
    receiving, using a matrix-shaped detector unit of a receiving unit, secondary light reflected and/or scattered by an object in the field of view, wherein the detector unit has a first reception area and a second reception area different from the first reception area;
    determining, using an evaluation unit, a distance between the LIDAR sensor and an object in the field of view of the LIDAR sensor based on secondary light received in the first reception area; and
    ascertaining, using an evaluation unit, information about an extent of the defocusing based on secondary light received in the second reception area;
    wherein:
        the first reception area is determined a calibration of the matrix-shaped detector unit;
        the first reception area and the second reception area are separately activated for receiving secondary light; and
        the second reception area is activated during individual scan recordings of several temporally consecutive scan recordings.

2. The method according to claim 1, wherein:
    the first reception area is formed from a first sequence of pixels along several rows of the matrix-shaped detector unit, wherein the first sequence includes exactly one pixel in each row; and
    the second reception area is formed from a second sequence of pixels along the several rows of the matrix-shaped detector unit, wherein the second sequence includes exactly one pixel in each row, and wherein the pixels of the second sequence in each row are shifted by the same number of pixels and in the same direction relative to a respectively adjacent pixel of the first sequence in the row.

3. The method according to claim 2 wherein the first sequence is configured in such a way: that a pixel of a row of the matrix-shaped detector unit is located in the same column as a pixel of a directly adjacent row of the matrix-shaped detector unit and/or that a pixel of a row of the matrix-shaped detector unit is located in a directly adjacent column as a pixel of a directly adjacent row of the matrix-shaped detector unit.

4. The method according to claim 1, further comprising:
    transmitting the ascertained information about an extent of the defocusing to a control unit of a vehicle, the control unit being configured to control a driving function of the vehicle.

5. The method according to claim 1, further comprising:
    controlling a cleaning device of the LIDAR sensor based on the extent of the defocusing exceeds a predetermined threshold value.

6. A non-transitory machine-readable storage medium on which is stored a computer program for detecting a defocusing of a LIDAR sensor, the computer program, when executed by a computer, causing the computer to perform the following steps:
    emitting primary light in the form of a laser line into a field of view of the LIDAR sensor using at least one laser emitter unit of a transmitting unit of the LIDAR sensor for scanning the field of view;
    receiving, using a matrix-shaped detector unit of a receiving unit, secondary light reflected and/or scattered by an object in the field of view, wherein the detector unit has a first reception area and a second reception area different from the first reception area;
    determining, using an evaluation unit, a distance between the LIDAR sensor and an object in the field of view of the LIDAR sensor based on secondary light received in the first reception area; and
    ascertaining, using an evaluation unit, information about an extent of the defocusing based on secondary light received in the second reception area;
    wherein:
        the first reception area is determined a calibration of the matrix-shaped detector unit;
        the first reception area and the second reception area are separately activated for receiving secondary light; and
        the second reception area is activated during individual scan recordings of several temporally consecutive scan recordings.

7. A LIDAR sensor, comprising:
    a transmitting unit including at least one laser emitter unit, which is configured to emit primary light in the form of a laser line into a field of view of the LIDAR sensor;
    a receiving unit including a matrix-shaped detector unit, which is configured to receive secondary light reflected and/or scattered by an object in the field of view, wherein the detector unit has a first reception area and a second reception area different from the first reception area; and
    an evaluation unit, which is configured to determine a distance between the LIDAR sensor and an object in the field of view of the LIDAR sensor based on secondary light received in the first reception area and to ascertain information about an extent of a defocusing of the LIDAR sensor based on secondary light received in the second reception area;
    wherein:
        the first reception area is determined by a calibration of the matrix-shaped detector unit;
        the first reception area and the second reception area can separately be activated for receiving secondary light; and
        the second reception area can be activated during individual scan recordings of several temporally consecutive scan recordings.

8. The LIDAR sensor according to claim 7, wherein:
    the first reception area is formed from a first sequence of pixels along several rows of the matrix-shaped detector unit, wherein the first sequence includes exactly one pixel in each row; and
    the second reception area is formed from a second sequence of pixels along the several rows of the matrix-shaped detector unit, wherein the second sequence includes exactly one pixel in each row, and wherein the pixels of the second sequence in each row are shifted by the same number of pixels and in the same direction relative to a respectively adjacent pixel of the first sequence in the row.

9. The LIDAR sensor according to claim 7, further comprising a cleaning device configured to prevent and/or inhibit and/or eliminate at least one contamination of the protective glass.

* * * * *